(12) United States Patent  
Saeki et al.

(10) Patent No.: US 6,597,862 B1  
(45) Date of Patent: Jul. 22, 2003

(54) APPARATUS AND METHOD FOR RECORDING DATA

(75) Inventors: Shinichi Saeki, Osaka (JP); Kazuhiro Tsuga, Hyogo (JP); Hidefumi Ino, Osaka (JP); Tokuo Nakatani, Osaka (JP); Yasushi Tamakoshi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/265,702

(22) Filed: Mar. 10, 1999

(30) Foreign Application Priority Data

Mar. 10, 1998 (JP) .......................... 10-057810  
Apr. 6, 1998 (JP) .......................... 10-093120

(51) Int. Cl.⁷ .................. H04N 5/781; H04N 5/85; H04N 8/90; H04N 5/91
(52) U.S. Cl. ...................... 386/125; 386/126
(58) Field of Search .............. 386/33, 45, 111, 386/112, 125–126; 711/14; 369/30.28, 30.3, 30.27

(56) References Cited

U.S. PATENT DOCUMENTS

| | | | | | |
|---|---|---|---|---|---|
| 5,025,432 A | * | 6/1991 | Naito | ...................... | 369/30.28 |
| 5,463,605 A | | 10/1995 | Nishida et al. | | |
| 5,721,803 A | * | 2/1998 | Haraguchi | ................... | 386/15 |
| 5,731,923 A | * | 3/1998 | Sakuma | ....................... | 360/135 |
| 5,754,730 A | * | 5/1998 | Windrem et al. | ........... | 386/124 |
| 5,841,743 A | * | 11/1998 | Kobayashi et al. | ........ | 369/30.3 |
| 5,905,847 A | * | 5/1999 | Kobayashi et al. | ......... | 386/113 |
| 5,923,817 A | * | 7/1999 | Nakamura | .................. | 386/124 |
| 6,021,464 A | * | 2/2000 | Yao et al. | ..................... | 710/41 |
| 6,035,091 A | * | 3/2000 | Kazo | ........................... | 386/46 |
| 6,064,635 A | * | 5/2000 | Machiguchi | ............. | 369/30.31 |
| 6,085,019 A | * | 7/2000 | Ito et al. | ....................... | 386/52 |
| 6,185,368 B1 | * | 2/2001 | Iwasaki et al. | ............. | 386/125 |
| 6,462,753 B1 | * | 10/2002 | Koyata et al. | .............. | 345/716 |

FOREIGN PATENT DOCUMENTS

EP 0 798 718 10/1997

OTHER PUBLICATIONS

European Search Report, Oct. 16, 2000, 3 pages.  
European Search Report, Dec. 7, 2000, 3 pages.  
Patent Abstracts of Japan, Reproducing Device, Jan. 13, 1995, 07–02921, English Abstract.  
Patent Abstracts of Japan, Disk Recording and Reproducing Device, Jan. 12, 1996, 08–007454, English Abstract.  
Patent Abstracts of Japan, Image Forming Device, Oct. 1, 1996, 08–256307, English Abstract.  
Patent Abstracts of Japan, Disk Changer Device, Dec. 24, 1996, 08–339605, English Abstract.

\* cited by examiner

Primary Examiner—Thai Tran  
Assistant Examiner—Polin Chieu  
(74) Attorney, Agent, or Firm—Nixon Peabody LLP; Donald R. Studebaker

(57) ABSTRACT

An individual information manager manages individual information of respective disks housed in a disk housing. The individual information includes residual area information indicative of the size of a residual area on which data is recordable. A disk selection controller selects a target disk from the disks housed in the housing by reference to the individual information of the respective disks that is managed by the individual information manager. In this configuration, a target disk can be appropriately selected in view of residual capacities of respective disks used during recording data, even if the user does not specify any disk.

10 Claims, 15 Drawing Sheets

Fig. 4

Do you record on a particular disk?

☐ Yes
☐ No

Fig. 5

Following is a list of recordable disks:
which disk do you select?

☐ disk 1
☐ disk 3
☐ disk 5
☐ disk 8

Fig. 8

Following is a list of recordable disks: which disk do you select?

☐ unspecified
☐ disk 1
☐ disk 3
☐ disk 5
☐ disk 8

APPARATUS AND METHOD FOR RECORDING DATA

BACKGROUND OF THE INVENTION

The present invention relates to apparatus and method for recording data on a target storage medium selected from a plurality of storage media housed in a storage medium housing, and more particularly relates to an improved technique of controlling selection of the target storage medium on which data should be recorded.

A recorder with MD changer, in which a number of mini discs (MD's) can be housed, is one of known recorders including a disk housing where a plurality of storage media can be housed. The recorder with MD changer displays a list of MD's housed, prompts the user to select a preferred MD on which data should be recorded, and then records the data on the specified MD.

However, in using such a recorder with MD changer, even if the user does not want to specify any particular MD for recording data thereon, the user still must specify an MD for use in recording. Thus, such an operation might sometimes be troublesome for the user.

SUMMARY OF THE INVENTION

An object of the present invention is providing apparatus and method for recording data in a target storage medium selected from a plurality of storage media by reference to the residual capacities of respective storage media even if the user does not specify any particular storage medium.

Specifically, a recording apparatus according to the present invention includes: a storage medium housing for housing a plurality of storage media; a drive for recording data, including at least video data, on a target storage medium selected from the storage media housed in the storage medium housing; an individual information manager for managing to individual information of the respective storage media housed in the storage medium housing, the individual information including residual area information indicative of the size of a residual area on which data is recordable; and a controller for calculating the size of a residual area required for recording the data and selecting the target storage medium from the storage media housed in the storage medium housing by reference to the size calculated and the individual information of the respective storage media.

According to the present invention, the controller selects a target from the storage media housed in the storage medium housing by reference to the size calculated and the individual information of the respective storage media that is managed by the individual information manager. And the individual information includes the residual area information indicative of the size of a residual area on which data is recordable. Thus, a target storage medium can be appropriately selected in view of the residual capacities of the respective storage media.

In one embodiment of the present invention, the apparatus further includes an input section for receiving an instruction indicating whether or not a particular one of the storage media is specified. If the controller has received an instruction to specify a particular one of the storage media via the input section, then the controller selects the specified storage medium as the target storage medium. On the other hand, when no particular storage medium is specified, the controller selects at least one of the storage media, having a residual area large enough to record the data, as the target storage medium by reference to the residual area information included in the individual information.

In another embodiment of the present invention, the individual information manager manages attribute information, indicating whether or not each said storage medium housed in the storage medium housing is an unspecified storage medium to be used when no particular storage medium is specified, as a piece of the individual information for each said storage medium. If the controller has received the instruction to specify no particular storage medium via the input section, then the controller selects the target storage medium from the unspecified storage media by reference to the attribute information included in the individual information.

In still another embodiment, the individual information manager manages attribute information, indicating whether each said storage medium housed in the storage medium housing is read-only or rewritable, as a piece of the individual information for each said storage medium. And the controller selects the target storage medium from the rewritable storage media by reference to the attribute information included in the individual information.

In still another embodiment, the storage medium housing houses the respective storage media within a plurality of magazines, a predetermined number of the storage media being housed in each said magazine. The apparatus further includes an input section for receiving an instruction to specify a particular one of the magazines. The controller selects at least one of the storage media, having a residual area large enough to record the data, as the target storage medium from the magazine specified via the input section by reference to the residual area information included in the individual information.

In still another embodiment, the individual information manager manages identifier information, indicative of an identifier recorded on each said storage medium housed in the storage medium housing, as a piece of the individual information for each said storage medium. The apparatus further includes an input section for receiving an identifier of the target storage medium. If the controller has received the identifier of the target storage medium via the input section, then the controller selects one of the storage media, having the received identifier, as a qualified candidate of the target storage medium by reference to the identifier information included in the individual information.

In accordance with a recording method of the present invention, data, including at least video data, is recorded on a target storage medium selected from a plurality of storage media housed in a storage medium housing included in a recording apparatus. The method includes the steps of: managing individual information of each said storage medium housed, the individual information including residual area information indicative of the size of a residual area on which data is recordable; calculating the size of a residual area required for recording the data thereon; selecting the target storage medium from the housed storage media by reference to the size calculated and the individual information; and recording the data on the target storage medium.

According to the present invention, the target storage medium is selected by reference to the individual information (including the residual area information indicative of the size of a residual area on which data is recordable) of the respective storage media managed while the data is recorded. Thus, the target storage medium can be appropriately selected in view of the residual capacities of the respective storage media.

In one embodiment of the present invention, the method preferably further includes the step of receiving an instruction, indicating whether or not a particular one of the storage media is specified, from the outside of the recording apparatus during recording the data. The target selecting step includes the steps of: when a particular one of the storage media is specified, selecting the specified storage medium as the target storage medium; and when no particular storage medium is specified, selecting at least one of the storage media, having a residual area large enough to record the data, as the target storage medium by reference to the residual area information included in the individual information.

In another embodiment of the present invention, the method preferably further includes the step of managing attribute information, indicating whether or not each said storage medium is an unspecified storage medium to be used when no particular storage medium is specified, as a piece of the individual information for each said storage medium. The target selecting step includes the step of, when no particular storage medium is specified, selecting the target storage media from the unspecified storage media by reference to the attribute information included in the individual information.

In still another embodiment, the method preferably further includes the step of managing attribute information, indicating whether each said storage medium is read-only or rewritable, as a piece of the individual information for each said storage medium. The target selecting step includes the step of selecting the target storage media from the rewritable storage media by reference to the attribute information included in the individual information.

In still another embodiment, the respective storage media are housed within a plurality of magazines, a predetermined number of the storage media being stored in each said magazine. The method further includes the step of receiving an instruction to specify a particular one of the magazines from the outside of the recording apparatus. The target selecting step includes the step of selecting at least one of the storage media, having a residual area large enough to record the data, as the target storage medium from the specified magazine by reference to the residual area information included in the individual information.

In still another embodiment, the method preferably further includes the steps of: managing identifier information, indicative of an identifier recorded on each said storage medium, as a piece of the individual information for each said storage medium; and receiving an instruction to specify an identifier of the target storage medium from the outside of the recording apparatus during recording the data. The target selecting step includes the step of selecting one of the storage media having the specified identifier as a qualified candidate of the target storage medium by reference to the identifier information included in the individual information.

In accordance with another recording method of the present invention, data, including at least video data, is recorded on a target storage medium selected from a plurality of storage media housed in a storage medium housing included in a recording apparatus. The method includes the steps of: calculating the size of a residual area required for recording the data thereon; selecting some rewritable storage media from the storage media housed; selecting some unspecified storage media, to be used when no particular storage medium is specified, from the selected rewritable storage media; selecting some storage media, having respective residual areas equal to or larger than the calculated size, from the selected rewritable and unspecified storage media; selecting a storage medium, having a minimum or maximum residual area, from the selected storage media as the target storage medium; and recording the data on the target storage medium.

BRIEF DESCRIPTION OF THE DRAWINGS

FIG. 4 is a schematic representation illustrating an to exemplary message displayed on an output section shown in FIG. 1.

FIG. 5 is a schematic representation illustrating another exemplary message displayed on the output section shown in FIG. 1.

FIG. 8 is a schematic representation illustrating still another exemplary message displayed on the output section shown in FIG. 1.

DESCRIPTION OF THE PREFERRED EMBODIMENTS

Hereinafter, preferred embodiments of the present invention will be described with reference to the accompanying drawings.

Embodiment 1

Figure 1:
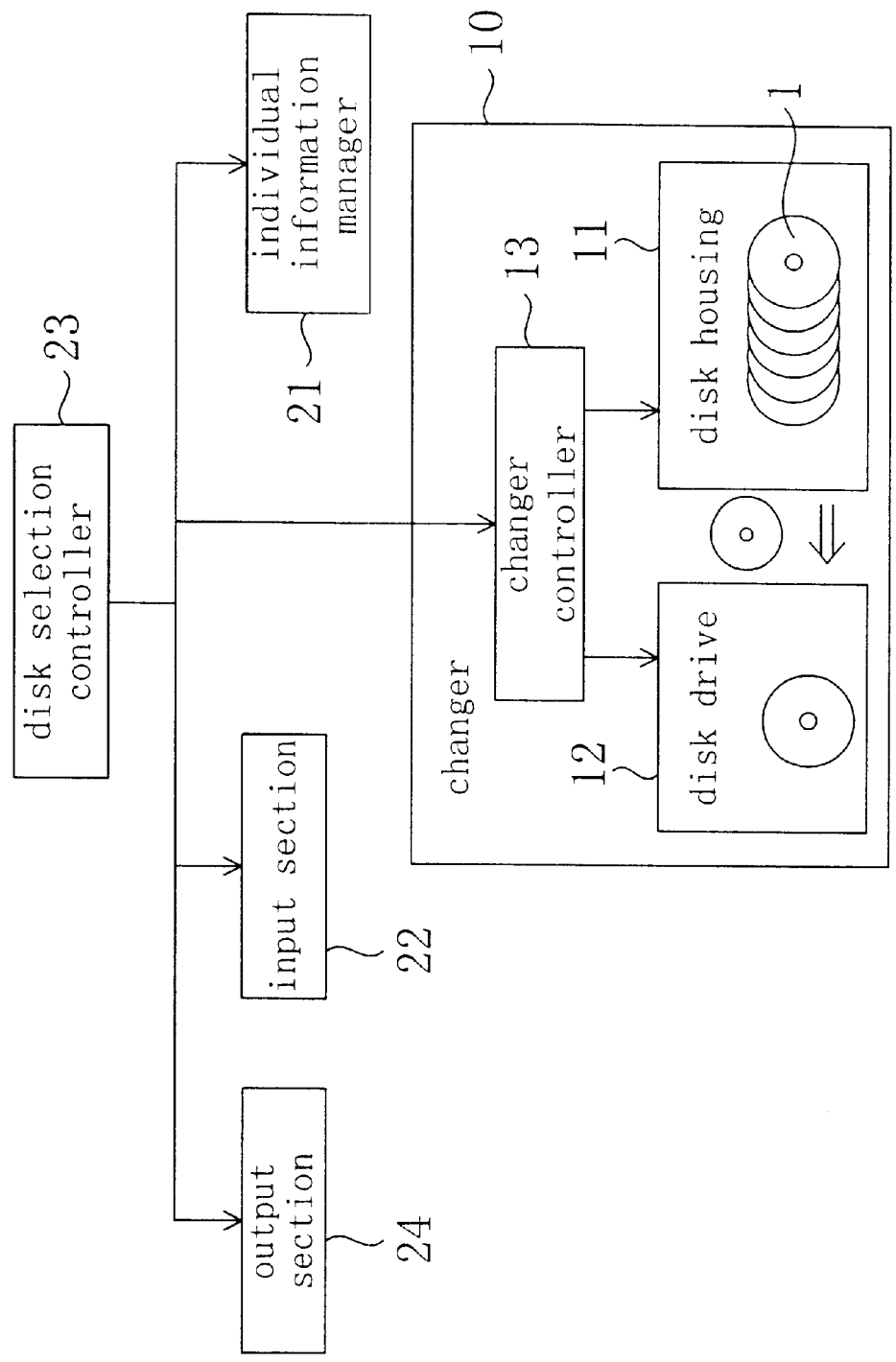
FIG. 1 is a block diagram illustrating a system configuration of a recording apparatus according to the first embodiment of the present invention.

FIG. 1 illustrates a system configuration of a recording apparatus according to the first embodiment of the present invention. As shown in FIG. 1, a changer 10 includes: a disk housing 11 (i.e., an exemplary storage medium housing); a disk drive 12; and a changer controller 13 (i.e., an exemplary controller). The disk housing 11 can house a plurality of disks 1 (i.e., exemplary storage media). The changer controller 13 controls the operations of selecting a particular disk 1 from those housed in the disk housing 11 and inserting the disk 1 into the disk drive 12. The disk drive 12 records data on the disk 1 inserted thereto. If necessary, the disk drive 12 may read data from the disk 1. In this specification and the appended claims, the "data" refers to data including at least video data.

An individual information manager 21 manages individual information, including residual area information representing the size of a residual area (residual capacity) on which data is recordable, for each of the disks 1 housed in the disk housing 11. An input section 22 receives an instruction from the user and then passes the instruction to a disk selection controller 23. Following the instruction, the disk selection controller 23 controls the changer controller 13 over the selection of a disk 1, which should be inserted into the disk drive 12 to record data thereon, by reference to the individual information of the respective disks 1 managed by the individual information manager 21. An output section 24 displays a message, etc., thereon for the user. For example, the input section 22 may be implemented to include a remote controller and a receiver for receiving a signal transmitted from the remote controller. And the output section 24 may be implemented to include a display and a transmitter for transmitting a signal to the display.

Figure 2:
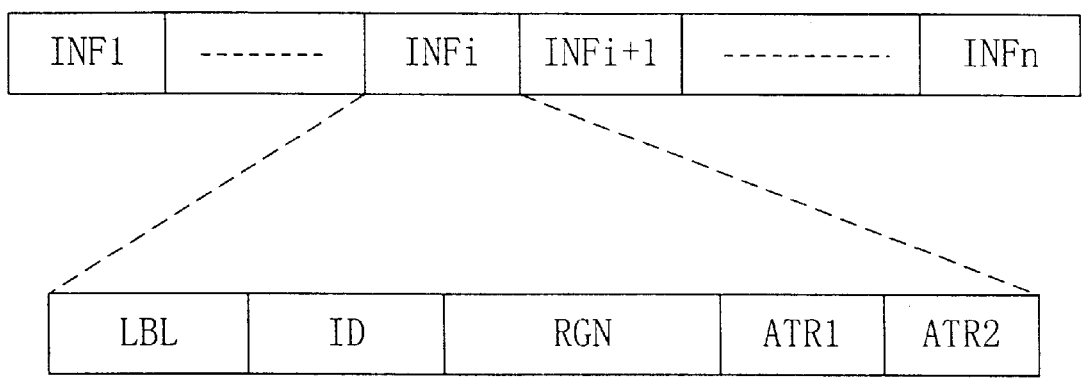
FIG. 2 is a diagram illustrating the contents of individual information managed by an individual information manager shown in FIG. 1.

FIG. 2 illustrates the contents of individual information managed by the individual information manager 21 for each disk 1. As shown in FIG. 2, the individual information manager 21 manages the individual information INFi of each disk 1 housed in the disk housing 11. In this case, i is a natural number in the range from 1 to n, and n is the number of disks 1 that can be housed in the disk housing 11. As shown in FIG. 2, each item of individual information includes: a disk label LBL; a disk identifier ID; residual area information RGN; and first and second attribute information ATR1 and ATR2. The disk label LBL represents the name of a disk. The disk identifier ID is used for identifying a disk. The residual area information RGN represents the size of a recordable, residual area of a disk. And the first and second attribute information ATR1 and ATR2 represent respective attributes of the disk. In this embodiment, the first attribute information ATR1 indicates whether the disk 1 in question is one of unspecified disks used when no particular disk is specified or a specified disk. The second attribute information ATR2 indicates whether the disk 1 in question is read-only (ROM) or rewritable (RAM).

It should be noted that in an actually implemented package, each disk 1 is provided with a unique ID in this world. In this case, the disk ID is data meaningless to the user, unlike an identifier employed by the user to identify the disk. Accordingly, this disk ID is not displayed to the user.

Figure 3:
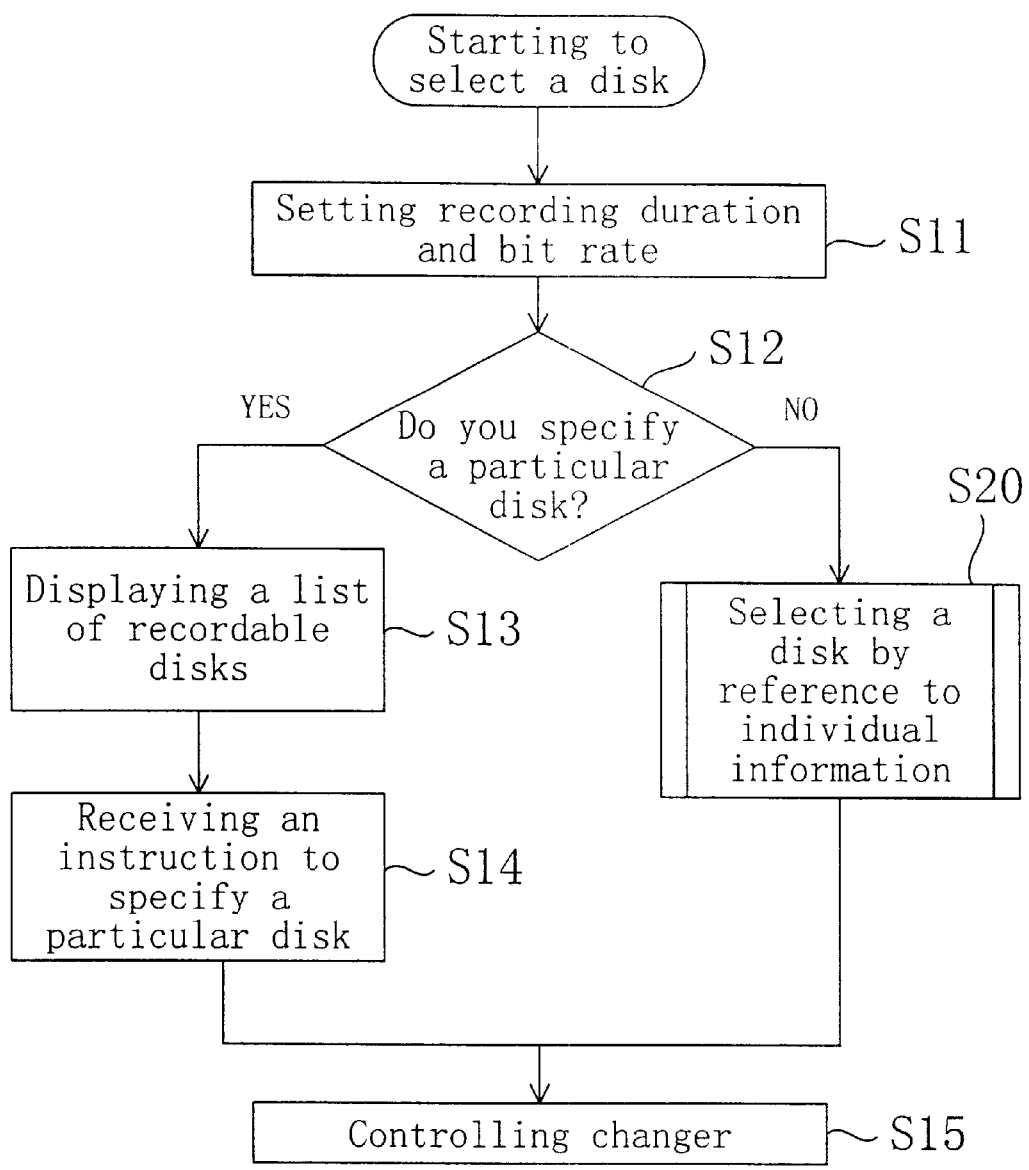
FIG. 3 is a flowchart illustrating an exemplary disk-selecting operation performed by the recording apparatus shown in FIG. 1.

FIG. 3 illustrates an exemplary disk-selecting operation performed by the recording apparatus shown in FIG. 1. In this embodiment, it is supposed that the user performs a reserved recording of a TV program by using the recording apparatus shown in FIG. 1.

First, in Step S11, the disk selection controller 23 sets recording duration and bit rate. Specifically, the disk selection controller 23 makes the output section 24 display a message asking the user when the recording should be started, when the recording should be ended and what type of image quality is preferred. In response to the start and end times and the preferred image quality, which have been received from the user via the input section 22, the disk selection controller 23 determines the recording duration and the bit rate. It should be noted that in performing a normal recording, not a reserved recording, a default value may be used as the recording duration and the user may be asked only of the image quality preferred.

Figure 4:
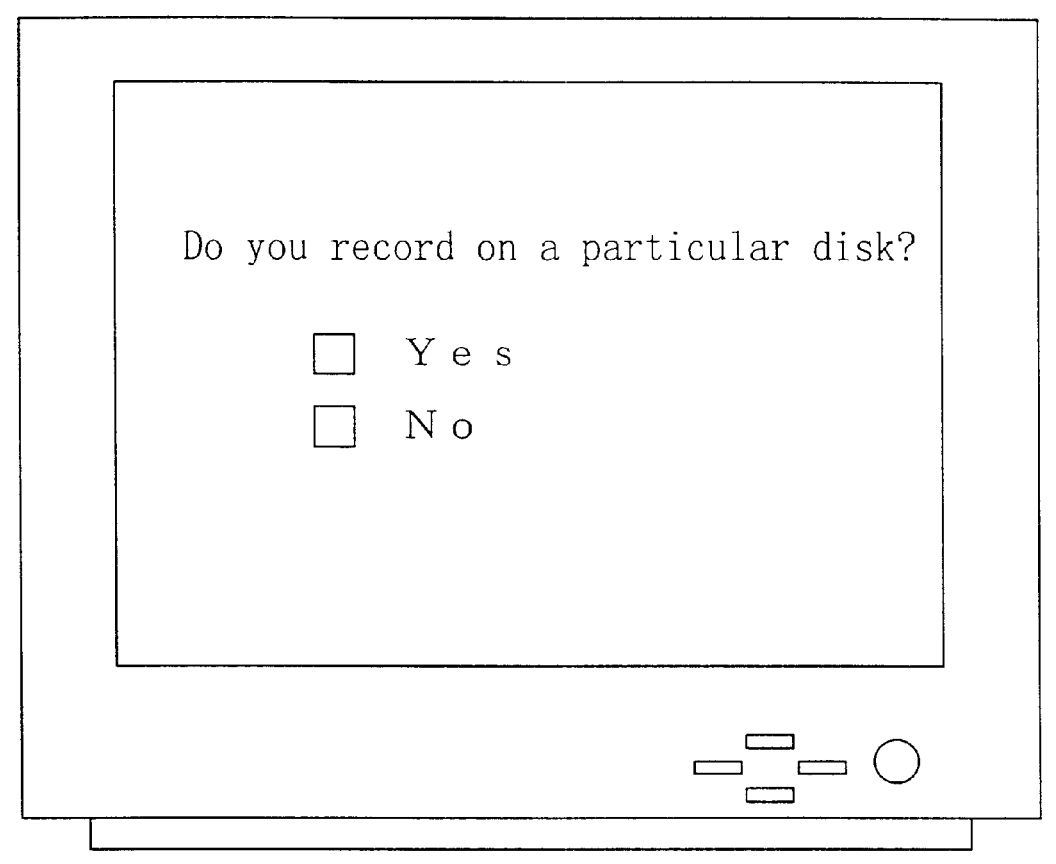

Next, in Step S12, the disk selection controller 23 receives an instruction, indicating whether or not the user specifies a particular disk for recording data thereon, from the user via the input section 22. FIG. 4 illustrates an exemplary message displayed on the output section 24 in Step S12.

If the answer is "YES" in Step S12, then the disk selection controller 23 makes the output section 24 display a list of recordable disks by reference to the individual information INTi of the respective disks 1 managed by the individual information manager 21 in Step S13. FIG. 5 illustrates an exemplary message displayed on the output section 24 in Step S13. In this case, unspecified disks may be excluded from the list of recordable disks by reference to the first attribute information ATR1 of the individual information INFi managed by the individual information manager 21. Alternatively, the unspecified disks may also be displayed as well. Furthermore, the sizes of residual areas and recordable times of respective disks may be displayed along with the names of the disks.

Then, in Step S14, the disk selection controller 23 receives the instruction to specify a particular disk for use in recording from the user via the input section 22. Subsequently, in Step S15, the disk selection controller 23 controls the changer 10 such that data is recorded on the disk specified in Step S14.

On the other hand, if the answer is "NO" in Step S12, then the disk selection controller 23 selects an appropriate disk to be used for recording by reference to the individual information INTi of the respective disks 1 managed by the individual information manager 21 in Step S20. And then, in Step S15, the disk selection controller 23 controls the changer 10 such that data is recorded on the disk selected in Step S20.

Figure 6:
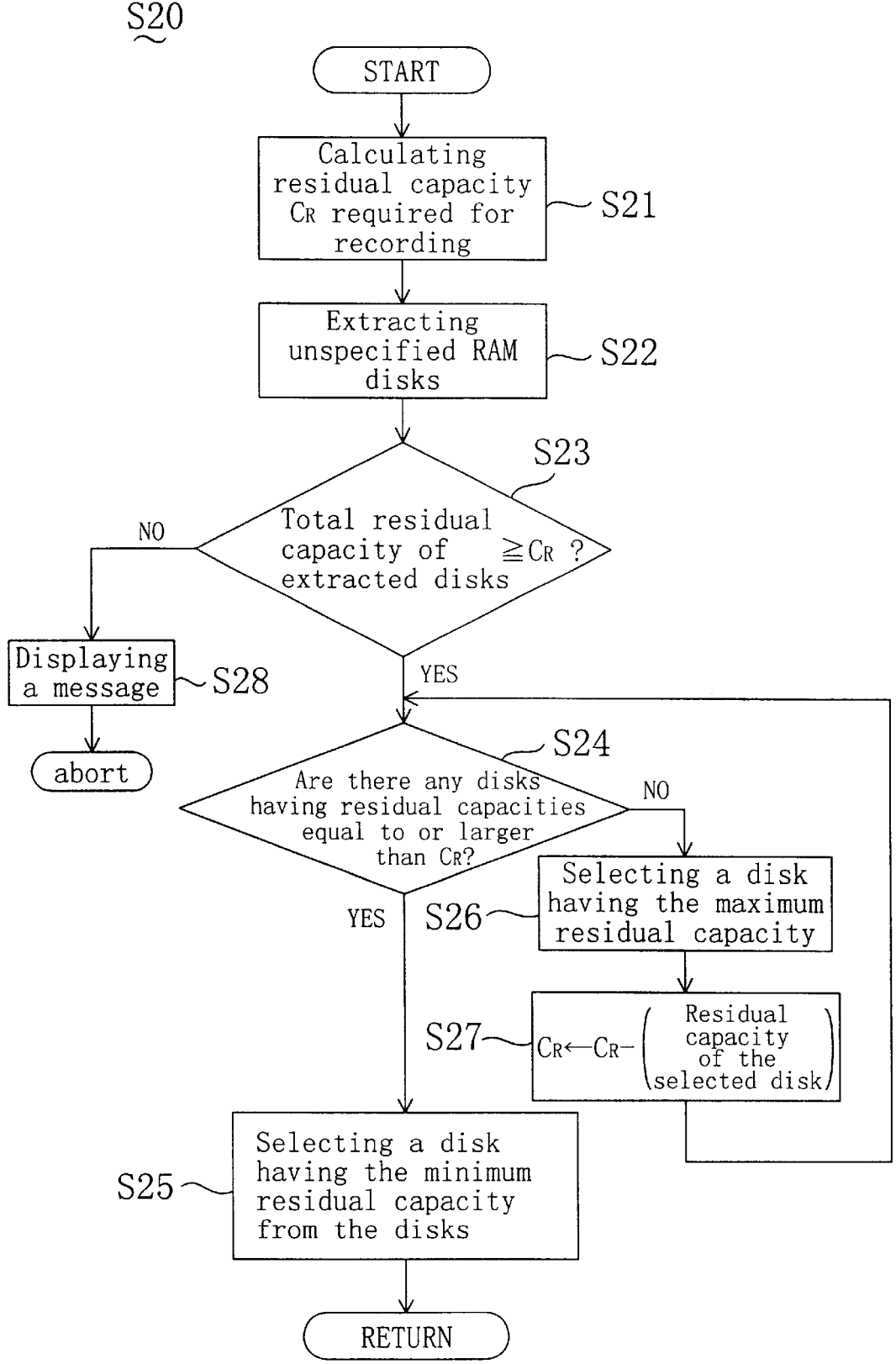
FIG. 6 is a flowchart illustrating the step S20 of selecting a disk shown in FIG. 3 in greater detail.

FIG. 6 illustrates the step S20 of selecting a disk in greater detail.

First, in Step S21, a residual capacity CR required for recording is calculated based on the recording duration and the bit rate. Next, in Step S22, some of unspecified RAM disks are extracted. Specifically, the disk selection controller 23 extracts several disks with their first attribute information ATR1 indicating their identity as unspecified disks and their second attribute information ATR2 indicating their identity as RAM disks by reference to the individual information INFi managed by the individual information manager 21.

Then, in Step S23, it is determined whether or not the total of the residual capacities of the disks extracted in Step S22 is equal to or larger than the required recording capacity CR. If the total residual capacity is smaller than the required recording capacity CR (the "NO" branch from Step S23), then the output section 24 displays a message like "recording impossible" in Step S28, thereby aborting the processing. Alternatively, if the total residual capacity is equal to or larger than the required recording capacity CR, then the procedure advances to Step S24.

Subsequently, in Step S24, it is determined whether or not there are any disks having residual capacities equal to or larger than the required recording capacity CR among the disks extracted in Step S22. If there are any disks having residual capacities equal to or larger than the required recording capacity CR (i.e., the "YES" branch from Step S24), then a disk having the minimum residual capacity is selected from these disks in Step S25 to complete the processing normally.

Alternatively, if there is no disk having a residual capacity equal to or larger than the required recording capacity CR (i.e., the "NO" branch from Step S24), then, in Step S26, a disk having the maximum residual capacity is selected from the disks extracted in Step S22. Then, the residual capacity of the disk selected in Step S26 is subtracted from the required recording capacity CR to obtain a newly required recording capacity CR' in Step S27 to return to Step S24.

In this embodiment, if there are several disks having residual capacities equal to or larger than the required recording capacity CR, then a disk having the minimum residual capacity is supposed to be selected in Step S25. Alternatively, a disk having the maximum residual capacity may be selected. Also, instead of selecting a disk having the maximum residual capacity in Step S26, a disk having the minimum residual capacity may be selected. Furthermore, if there are several candidate disks in Steps S25 and S26, any of these may be selected.

Moreover, in this Step S20 of selecting a disk, disks having residual capacities equal to or smaller than a predetermined value (e.g., disks having recordable times of 5 minutes or less) may be regarded as having no data recordable residual areas.

For example, in recording AV data on a disk, the AV data should be recorded in a continuous area of a predetermined size or more on the disk to ensure continuous reproduction of the AV data recorded. The minimum size of the continuous area is determined depending on the capacity of a buffer for a reproducing apparatus, e.g., about 7 MB. Accordingly, in Step S20, a disk may be selected by recognizing only continuous areas equal to or larger than the minimum size as residual areas on which AV data is recordable, and the other continuous areas, smaller than the minimum size, may be excluded.

More specifically, the individual information manager 21 manages a free list, on which information about the start and end addresses of respective residual areas on respective disks is managed in the form of a list, as a piece of the individual information. In response to a request of recording AV data, the disk selection controller 23 consults the free list managed by the individual information manager 21 to determine whether or not the total size of the AV data recordable residual areas on each disk is equal to or larger than the size required for recording the AV data requested. Based on the results of the size determination, the disk selection controller 23 selects some disk having an AV data recordable residual area equal to or larger than the required size and then writes the AV data thereon.

It should be noted that the individual information manager 21 may manage the AV data recordable residual areas (i.e., continuous areas of respective sizes equal to or larger than the minimum size) and the AV data non-recordable residual areas (i.e., continuous areas of respective sizes smaller than the minimum size) of respective disks. In such a case, the total size of the AV data recordable residual areas can be obtained by reference to these sizes without consulting the entire free list.

Figure 7:
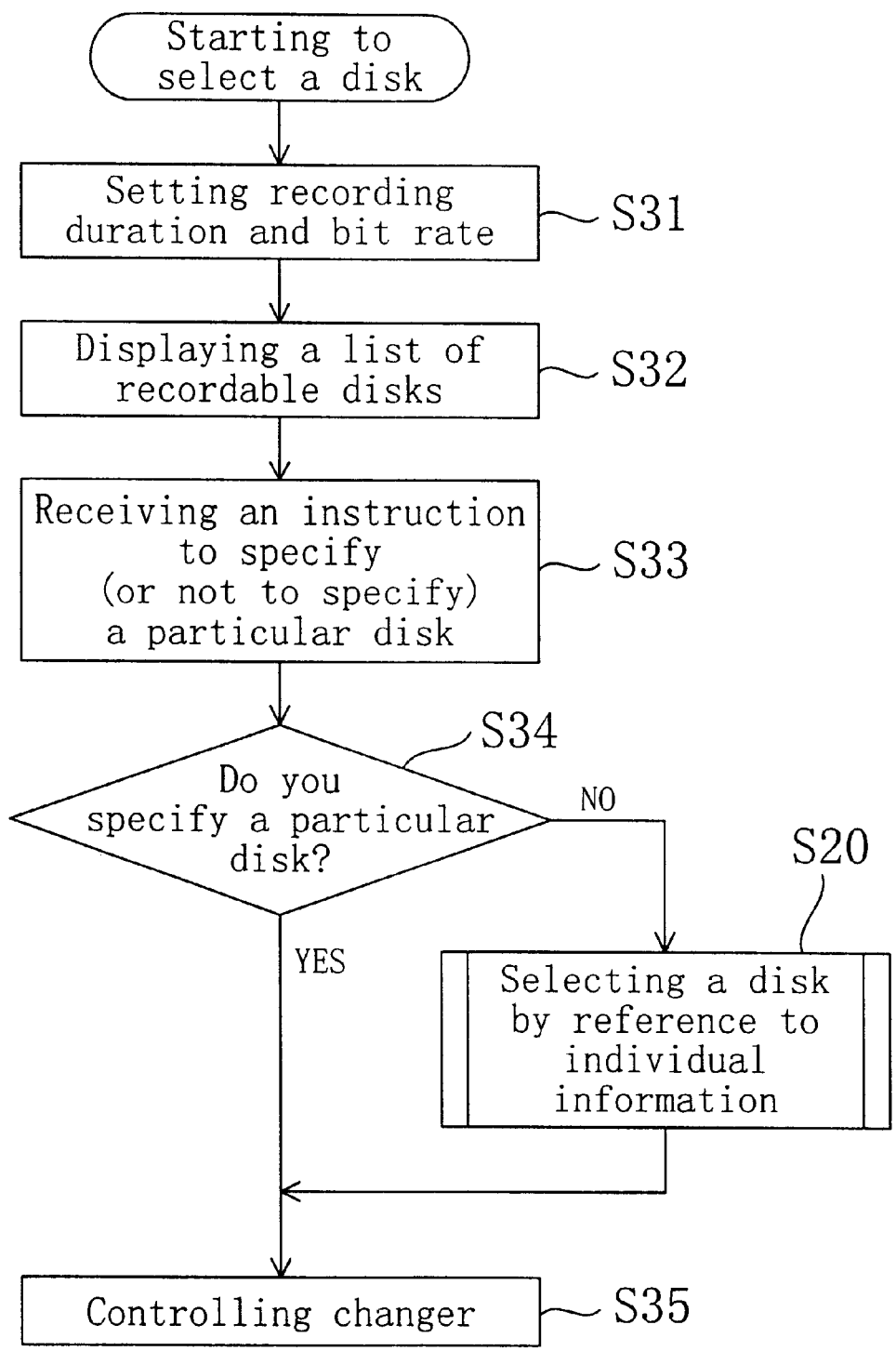
FIG. 7 is a flowchart illustrating another exemplary disk-selecting operation performed by the recording apparatus shown in FIG. 1.

FIG. 7 illustrates another exemplary disk-selecting operation performed by the recording apparatus shown in FIG. 1.

First, in Step S31, the disk selection controller 23 sets recording duration and bit rate. This Step S31 is performed in the same way as the Step S11 shown in FIG. 3.

Next, in Step S32, the disk selection controller 23 makes the output section 24 display a list of recordable disks by reference to the individual information INTi of the respective disks 1 managed by the individual information manager 21. FIG. 8 illustrates an exemplary message displayed on the output section 24 in Step S32. As shown in FIG. 8, the user may choose an option of "specifying no particular disk"0 instead of specifying a particular disk.

Then, in Step S33, the disk selection controller 23 receives the instruction to specify (or not to specify) a disk for recording from the user via the input section 22. If the user has chosen to "specify no particular disk" (i.e., the "NO" branch from S34), then the disk selection controller 23 selects a disk by reference to the individual information INFi of the respective disks 1 managed by the individual information manager 21 as in Step S20 shown in FIG. 3.

In this embodiment, recording is supposed not to be performed if the total residual area of all the disks is smaller than the residual area required for recording the data. Optionally, recording may be performed so far as it is possible, or until there is no residual capacity.

Embodiment 2

Figure 9:
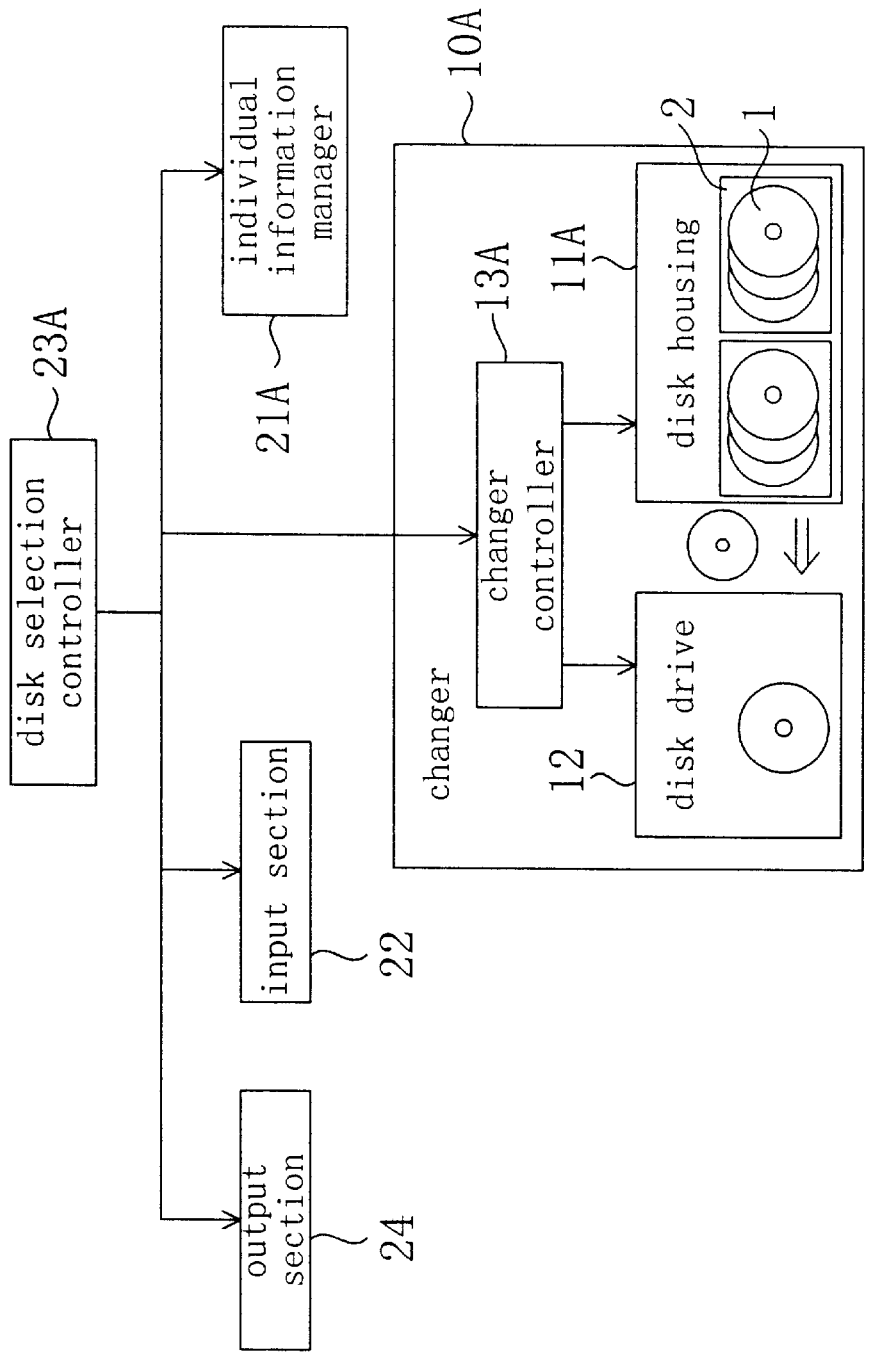
FIG. 9 is a block diagram illustrating a system configuration of a recording apparatus according to the second embodiment of the present invention.

FIG. 9 illustrates a system configuration of a recording apparatus according to the second embodiment of the present invention. In FIG. 9, the same components as those shown in FIG. 1 are identified by the same reference numerals. In this embodiment, a disk housing 11A includes a plurality of magazines 2, each of which can house a predetermined number (e.g., three in FIG. 9) of disks 1.

Figure 10:
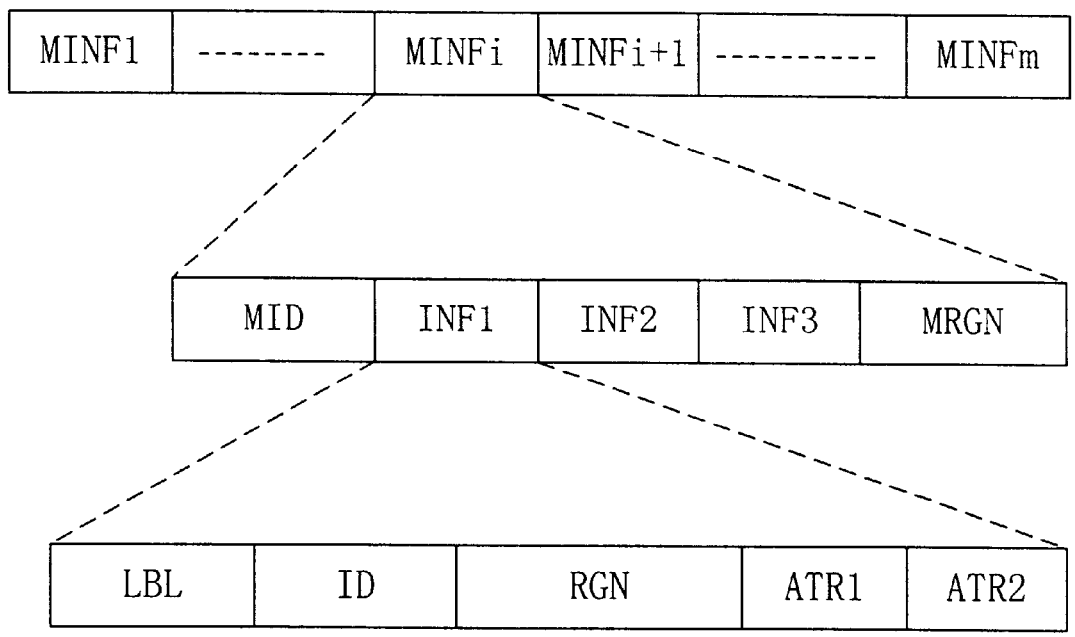
FIG. 10 is a diagram illustrating the contents of individual information managed by an individual information manager shown in FIG. 9.

FIG. 10 illustrates the contents of individual information managed by an individual information manager 21A for each disk 1. As shown in FIG. 10, the individual information manager 21A manages the individual information MINFi of each disk 1 housed in the disk housing 11A on the magazine basis. In this embodiment, i is also a natural number in the range from 1 to m, and m is the number of magazines 2 that can be housed in the disk housing 11A. Each item of individual information MINFi includes: a magazine identifier MID; individual information items INF1 through INF3 of the three disks 1 housed in the magazine 2; and magazine residual area information MRGN. The magazine identifier MID is used for identifying a magazine 2. And the magazine residual area information MRGN represents the total of the residual capacities of the disks 1 housed in the magazine 2. Like the individual information INFi shown in FIG. 2, each item of individual information INF1 through INF3 of the disks 1 includes: a disk label LBL; a disk identifier ID; residual area information RGN; and first and second attribute information ATR1 and ATR2. The magazine residual area information MRGN is obtained by adding together the respective sizes of the residual areas represented by the residual area information RGN included in the individual information INF1 through INF3 of the disks 1 housed in the magazine 2.

Figure 11:
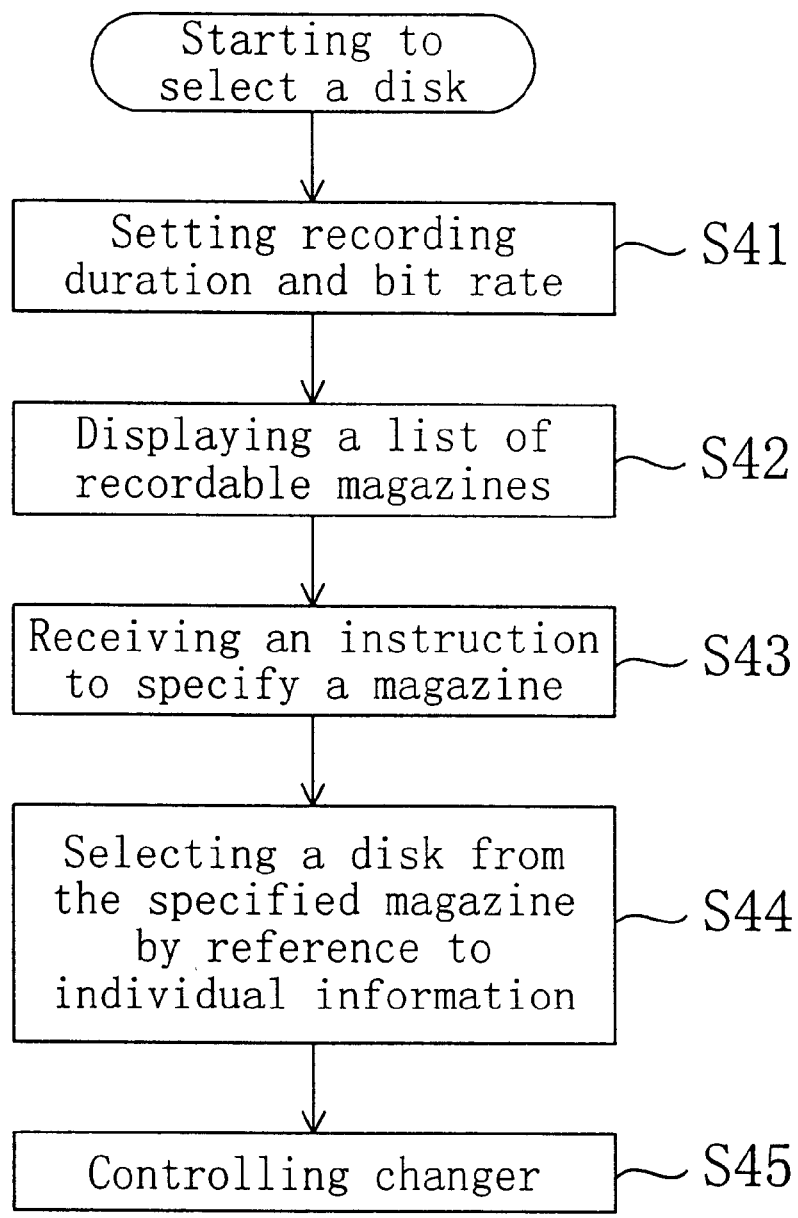
FIG. 11 is a flowchart illustrating an exemplary disk-selecting operation performed by the recording apparatus shown in FIG. 9.

FIG. 11 illustrates an exemplary disk-selecting operation performed by the recording apparatus shown in FIG. 9. In this embodiment, it is also supposed that the user performs a reserved recording of a TV program by using the recording apparatus shown in FIG. 9.

First, in Step S41, the disk selection controller 23A sets recording duration and bit rate. This Step S41 is performed in the same way as Step S11 shown in FIG. 3.

Next, in Step S42, the disk selection controller 23A makes the output section 24 display a list of recordable magazines 2 by reference to the individual information MINTi of the respective magazines 2 managed by the individual information manager 21A. Subsequently, in Step S43, the disk selection controller 23A receives the instruction to specify a particular magazine 2 used for recording from the user via the input section 22.

Then, in Step S44, the disk selection controller 23A selects a disk 1, having a residual area large enough to record the data, as a target disk by reference to the residual area information RGN of the respective disks 1 included in the individual information MINFi of the magazine 2 selected in Step S43. Finally, in Step S45, the disk selection controller 23A controls the changer 10A such that the data is recorded on the disk selected as a disk for recording.

In this embodiment, a particular magazine is supposed to be always specified. If no magazine has been specified, however, then the selection of a magazine may be performed in the same way as the selection of a disk in the first embodiment.

Embodiment 3

Figure 12:
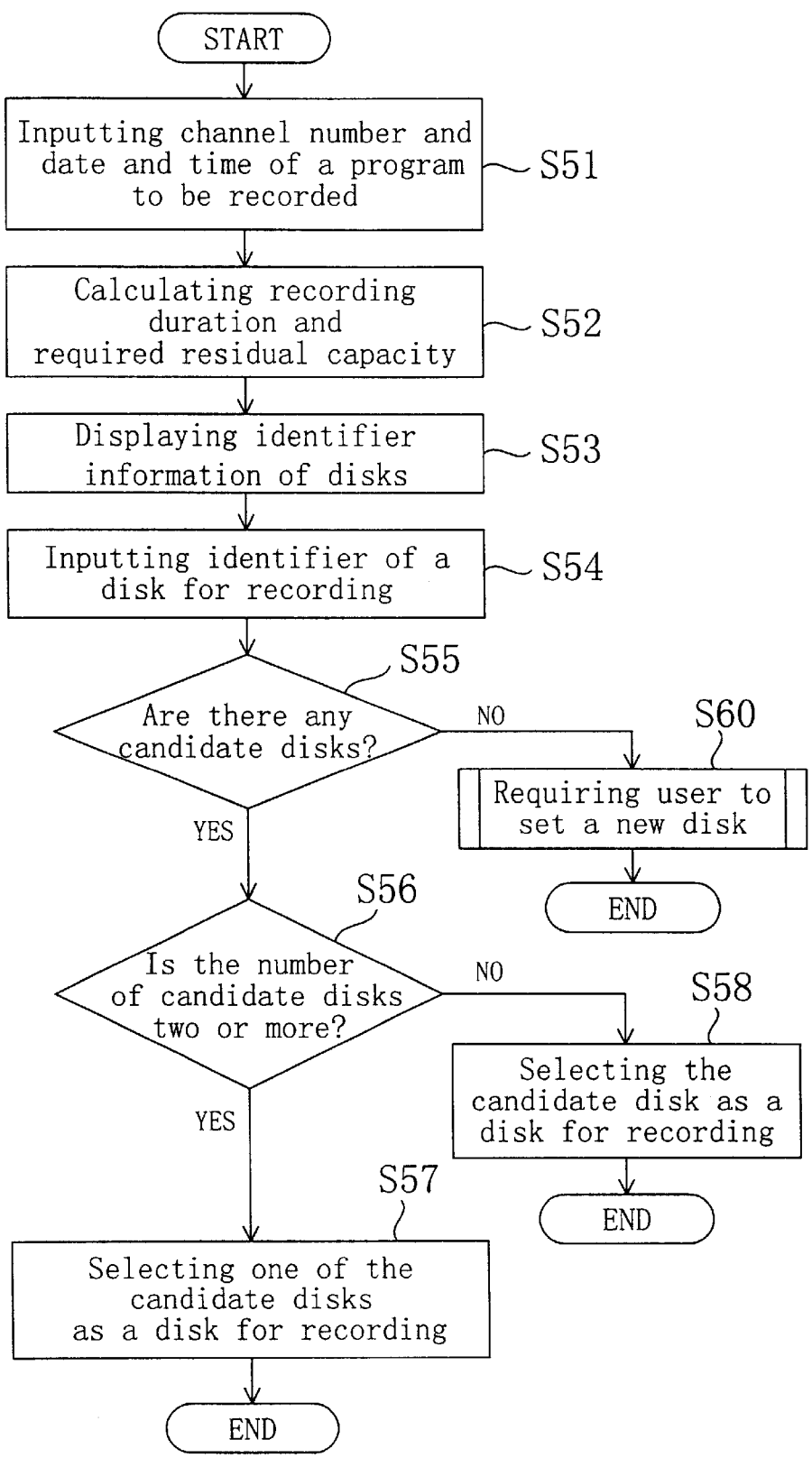
FIG. 12 is a flowchart illustrating a recording method according to the third embodiment of the present invention.

FIG. 12 illustrates a recording method according to the third embodiment of the present invention. In this embodiment, it is also supposed that the user performs a reserved recording of a TV program by using the recording apparatus shown in FIG. 1. The individual information manager 21 uses the identifier information of each disk 1.

First, in Step S51, the user inputs the number of a channel, on which the program to be recorded will be broadcast, and the date and time, when the program will be broadcast, to the recorder. Specifically, the disk selection controller 23 receives the channel number and the broadcast date and time via the input section 22. Next, in Step S52, the disk selection controller 23 calculates recording duration and a residual capacity of the disk 1 required for recording.

Then, in Step S53, the disk selection controller 23 makes the output section 24 display the identifier information of respective disks 1 by reference to the individual information INFi managed by the individual information manager 21. It should be noted that Steps S52 and S53 are not necessarily performed in this order, but may be performed concurrently, for example. That is to say, a residual capacity required for recording may be calculated while at the same time the output section 24 is made to display the identifier information of respective disks 1. Thereafter, in Step S54, the user specifies the identifier of a disk 1 used for recording. Specifically, the disk selection controller 23 inputs the identifier of the disk 1 for recording via the input section 22.

Next, in Step S55, the disk selection controller 23 determines whether or not there are any qualified candidate disks having not only the specified identifier but also the required residual capacity calculated in Step S52 by reference to the individual information INFi managed by the individual information manager 21. If it is determined that there are no candidate disks (i.e., the "NO" branch from S55), the user is required to set a new disk in Step S60, the details of which will be described later.

Alternatively, if there are any candidate disks (i.e., the "YES" branch from S55), then the disk selection controller 23 determines in Step S56 whether or not the number of candidate disks is two or more. If there are two or more candidate disks (i.e., the "YES" branch from S56), then one of the candidate disks is selected as a disk for recording in Step S57, the details of which will also be described later. On the other hand, if there is only one candidate disk (i.e., the "NO" branch from S56), then the candidate disk is selected as the disk for recording in Step S58.

It should be noted that if the user specifies no identifier in Step S54, the same processing is performed using disks having no identifiers and having the required residual capacity as candidate disks.

Figure 13:
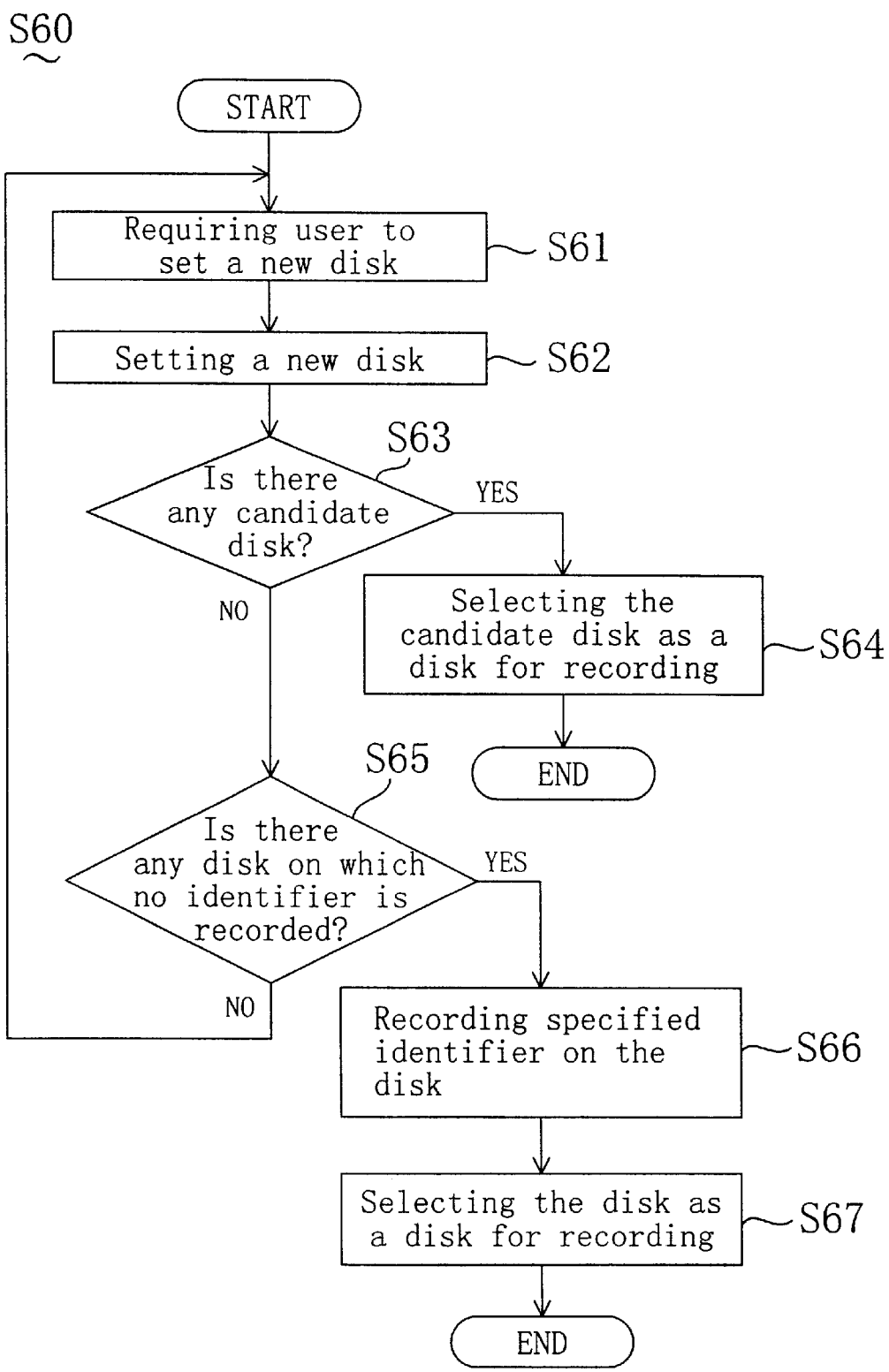
FIG. 13 is a flowchart illustrating the step S60 shown in FIG. 12 in greater detail.

FIG. 13 illustrates the Step S60 in greater detail.

First, in Step S61, the user is requested to set a new disk via the output section 24. In this case, a "new disk"0 means a disk having an identifier specified by the user or a disk having no identifier. In response to this request, the user sets a new disk into the disk housing 11 in Step S62. And then the individual information of the newly set disk is stored in the individual information manager 21.

Next, in Step S63, the disk selection controller 23 determines whether or not there is any candidate disk in the disk housing 11 by reference to the individual information INFi managed by the individual information manager 21. If it is determined that there is some candidate disk (i.e., the "YES"0 branch from S63), then the candidate disk is selected as a disk for recording in Step S64.

Alternatively, if it is determined that there is no candidate disk (i.e., the "NO" branch from S63), then the disk selection controller 23 determines in Step S65 whether or not there is any disk with no identifier recorded by reference to the individual information INFi managed by the individual information manager 21. If it is determined that there is such a disk (i.e., the "YES" branch from S65), the specified identifier is recorded on the disk in Step S66, and the disk is selected as a disk for recording in Step S67. Alternatively, if it is determined that there is no disk with no identifier recorded (i.e., the "NO" branch from S65), then the procedure returns to Step S61 to require the user to set a new disk.

It should be noted that a disk having only a specified identifier may be used as a candidate disk, instead of a disk having not only the specified identifier but also a required residual capacity. In such a case, only the identifier information included in the individual information INFi should be referred to, and the residual area information RGN does not have to be consulted.

In Step S57, a disk may be selected in the following manner, for example.

As a first possibility, a disk may be selected based on identifier recording date information, representing the date and time when an identifier was recorded, as a piece of the individual information INFi managed by the individual information manager 21. In this case, either a disk having the oldest identifier or a disk having the newest identifier may be selected based on the identifier recording date information.

As another option, a disk may also be selected by reference to the residual area information RGN managed by the individual information manager 21. In this case, either a disk having the largest residual area or a disk having the smallest residual area may be selected based on the residual area information RGN.

Furthermore, a disk may also be selected based on the data recording date information, representing the date and time when data was recorded, as a piece of the individual information INFi managed by the individual information manager 21. In this case, either a disk having the oldest data or a disk having the newest data may be selected based on the data recording date information.

It should be noted that this third embodiment may be combined with the first or second embodiment. For example, in the third embodiment, the user is supposed to specify a particular disk. Alternatively, as described in the first embodiment, the user may select either the use of a particular disk or the use of an unspecified disk. If the user has selected the option of using an unspecified disk, the selection may be controlled in the same way as in the first embodiment.

Figure 14:
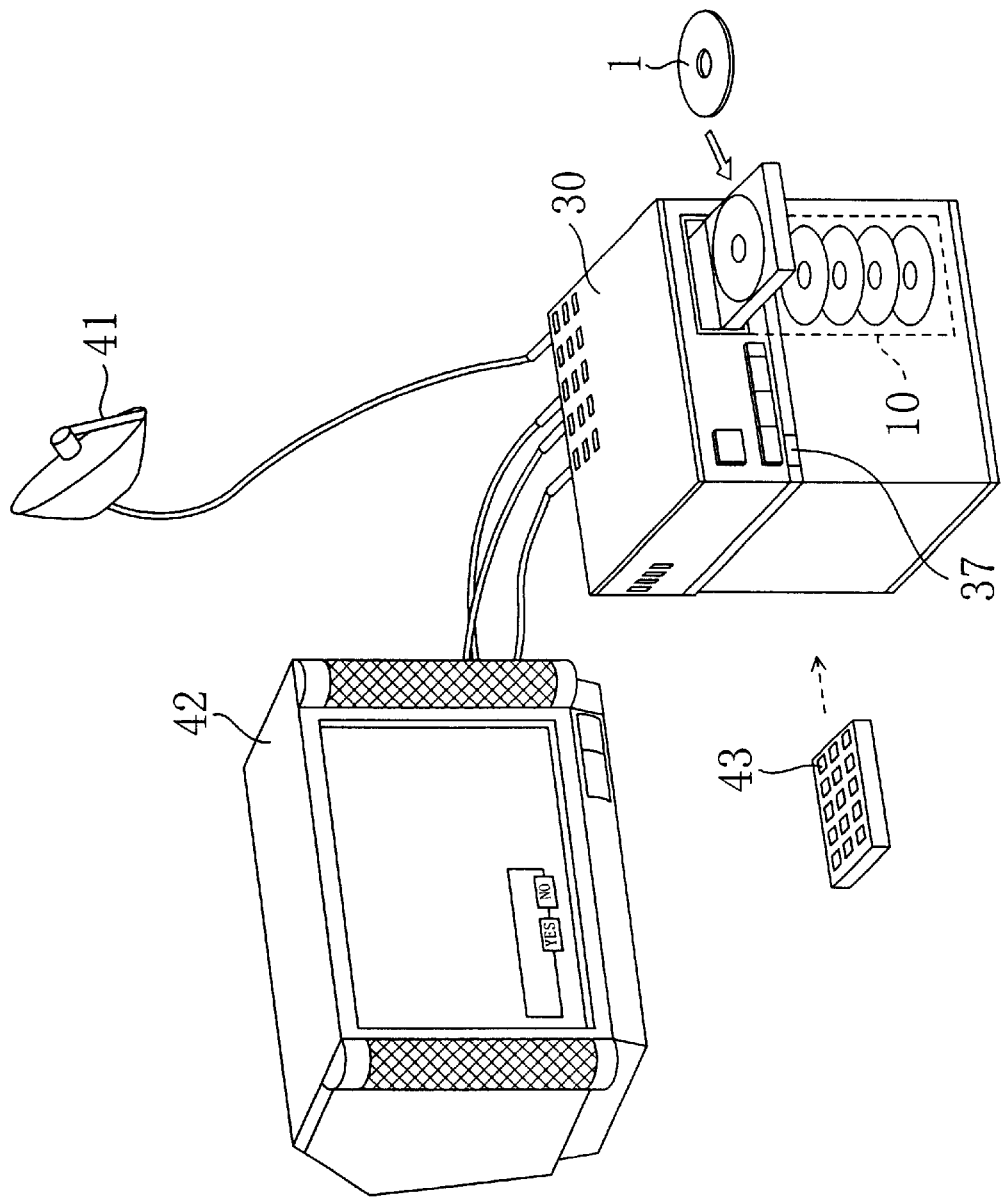
FIG. 14 is a schematic representation illustrating an exemplary configuration of a system including a DVD recorder implemented as a recording apparatus according to the present invention.

FIG. 14 illustrates a configuration of a system including a DVD recorder as an exemplary recording apparatus according to the present invention. In this example, a DVD rewritable disk (DVD-RAM disk) is used as an exemplary storage medium, or disk 1. It should be noted that only DVD-RAM disks may be housed or both RAM's and ROM's may be housed within a single system.

As shown in FIG. 14, a DVD recorder 30 can house a plurality of disks 1 and is connected to a receiver 41 for receiving analog broadcast waves and to a display 42. The DVD recorder 30 reproduces image and sound, which have been recorded on the disk 1, on the display 42, and records a TV program, which has been received at the receiver 41, on the disk 1. And the user can operate the DVD recorder 30 using a remote controller 43.

Figure 15:
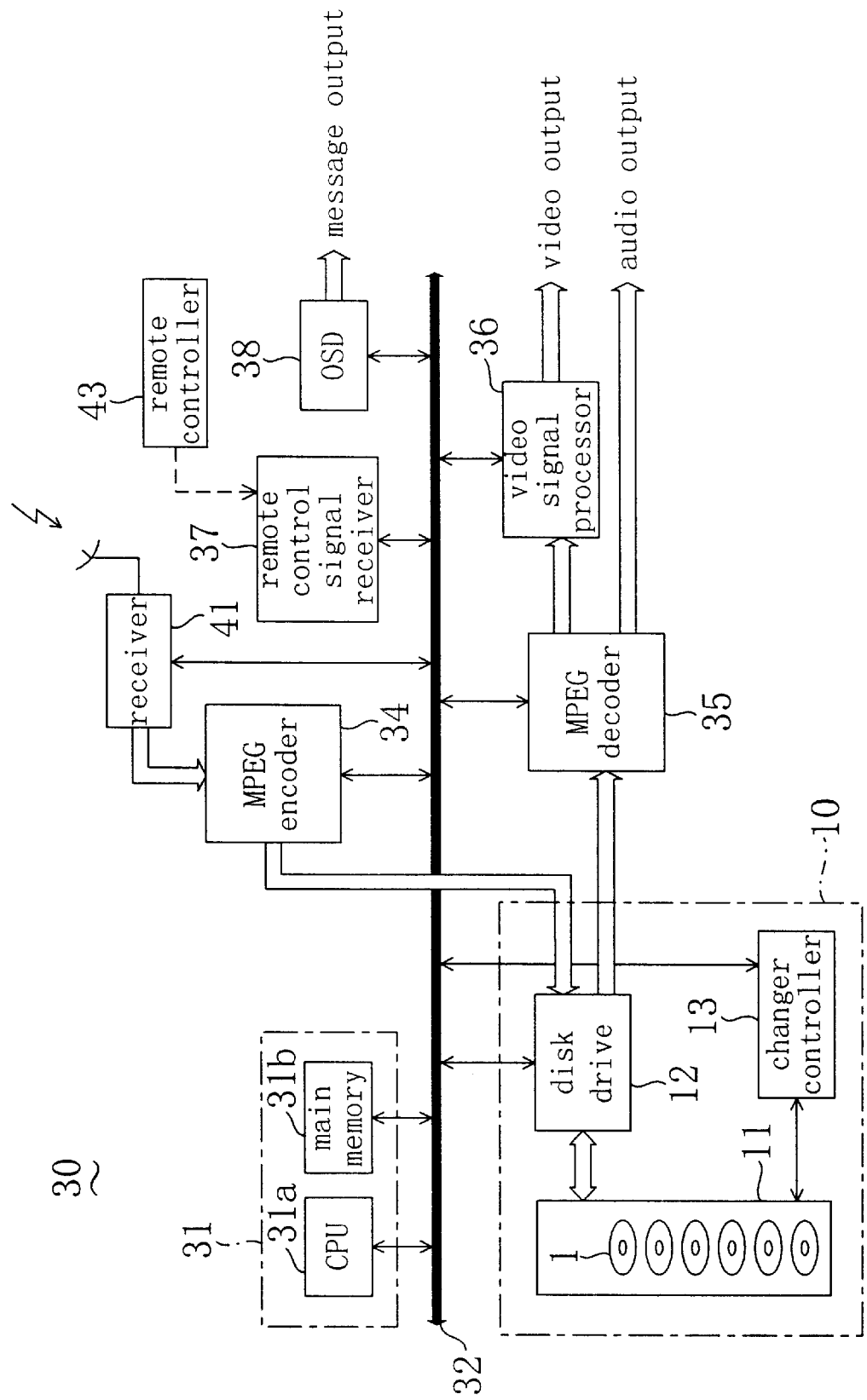
FIG. 15 is a block diagram illustrating an internal configuration of the DVD recorder shown in FIG. 14.

FIG. 15 illustrates an internal configuration of the DVD recorder 30 shown in FIG. 14. As shown in FIG. 15, the DVD recorder 30 includes: a changer 10; a system controller 31; a control bus 32; an MPEG encoder 34; an MPEG decoder 35; a video signal processor 36; a remote control signal receiver 37; and an on-screen display (OSD) 38. On the control bus 32, a control signal is transferred. The MPEG encoder 34 encodes a signal received at the receiver 41, while the MPEG decoder 35 decodes the output signal of the changer 10. The video signal processor 36 processes the video signal output from the MPEG decoder 35. The remote control signal receiver 37 receives a signal transmitted from the remote controller 43. And the OSD 38 displays a message on the display 42. A video signal output from the MPEG decoder 35 via the video signal processor 36 and an audio signal output from the MPEG decoder 35 are supplied to the display 42.

The system controller 31 includes a CPU 31*a* and a main memory 31*b*, and performs various types of processing in accordance with the programs stored in the main memory 31*b*. The system controller 31 is in charge of the operations of the disk selection controller 23 or 23A and the individual information manager 21 or 21A shown in FIG. 1 or 9. In this configuration, the remote control signal receiver 37 corresponds to the input section 22 and the OSD 38 corresponds to the output section 24.

A file system in compliance with ISO/IEC 13346 is used for a DVD-RAM disk. In this case, volume identifier information and volume identifier recording date information are supposed to be recorded on a "basic volume descriptor" in accordance with ISO/IEC 13346. The user may choose an arbitrary character string as the volume identifier information and a time when the volume identifier was written is recorded as volume identifier recording date information on the basic volume descriptor.

When a disk 1 is set into the changer 10, the information recorded on the basic volume descriptor and the size of the residual area are read out by the disk drive 12 and then stored in the main memory 31*b* of the system controller 31. The system controller 31 manages the volume identifier information, the volume identifier recording date information and the size of the residual area of each disk 1 as individual information.

As described above, the present invention makes it possible to appropriately select a target, on which data should be recorded, from a plurality of storage media housed in a housing in view of respective residual capacities thereof, even if the user does not specify any storage medium.

What is claimed is:

1. A recording apparatus comprising:
   a storage medium housing for housing a plurality of storage media;
   a drive for recording data, including at least video data, on a target storage medium selected from the storage media housed in the storage medium housing;
   an individual information manager for managing individual information of the respective storage media housed in the storage medium housing, the individual information including residual area information indicative of the size of a residual area on which data is recordable;
   a controller for calculating the size of a residual area required for recording the data and selecting the target storage medium from the storage media housed in the storage medium housing by reference to the size calculated and the individual information of the respective storage media; and
   an input section for receiving an identifier of the target storage medium,
   wherein the individual information manager manages identifier information, indicative of an identifier recorded on each said storage medium housed in the storage medium housing, as a piece of the individual information for each said storage medium,
   wherein if the controller has received the identifier of the target storage medium via the input section, then the controller selects one of the storage media having the received identifier as a qualified candidate of the target storage medium by reference to the identifier information included in the individual information, and
   wherein if the controller has determined by reference to the identifier information included in the individual information that no storage medium having the received identifier is housed in the storage medium housing, then the controller selects one of the storage media on which none of the identifiers is recorded, as the target storage medium and then records the received identifier on the selected storage medium.

2. A recording apparatus comprising:
   a storage medium housing for housing a plurality of storage media;
   a drive for recording data, including at least video data, on a target storage medium selected from the storage media housed in the storage medium housing;
   an individual information manager for managing individual information of the respective storage media housed in the storage medium housing, the individual information including residual area information indicative of the size of a residual area on which data is recordable;
   a controller for calculating the size of a residual area required for recording the data and selecting the target storage medium from the storage media housed in the storage medium housing by reference to the size calculated and the individual information of the respective storage media; and
   an input section for receiving an identifier of the target storage medium,
   wherein the individual information manager manages identifier information, indicative of an identifier recorded on each said storage medium housed in the storage medium housing, as a piece of the individual information for each said storage medium,
   wherein if the controller has received the identifier of the target storage medium via the input section, then the controller selects one of the storage media having the received identifier as a qualified candidate of the target storage medium by reference to the identifier information included in the individual information, and wherein if the controller has determined by reference to the identifier information and the residual area information included in the individual information that no storage medium, having not only the received identifier but also a residual area large enough to record the data, is housed in the storage medium housing, then the controller selects one of the storage media, on which none of the identifiers is recorded, as the target storage medium and then records the received identifier on the selected storage medium.

3. A recording apparatus comprising:

a storage medium housing for housing a plurality of storage media;

a drive for recording data, including at least video data, on a target storage medium selected from the storage media housed in the storage medium housing;

an individual information manager for managing individual information of the respective storage media housed in the storage medium housing, the individual information including residual area information indicative of the size of a residual area on which data is recordable;

a controller for calculating the size of a residual area required for recording the data and selecting the target storage medium from the storage media housed in the storage medium housing by reference to the size calculated and the individual information of the respective storage media; and input section for receiving an identifier of the target storage medium, wherein the individual information manager manages identifier information, indicative of an identifier recorded on each said storage medium housed in the storage medium housing, as a piece of the individual information for each said storage medium, wherein if the controller has received the identifier of the target storage medium via the input section, then the controller selects one of the storage media having the received identifier as a qualified candidate of the target storage medium by reference to the identifier information included in the individual information, wherein the individual information manager manages identifier recording date information, indicative of date and time when an identifier was recorded on each said storage medium housed in the storage medium housing, as a piece of the individual information, and wherein if some of the storage media have the received identifier in common, then the controller selects the target storage medium from these storage media based on the respective identifier recording date information included in the individual information.

4. The apparatus of claim 3, wherein the controller selects one of the storage media, on which the identifier was recorded at the earliest or latest time judging from the identifier recording date information thereof, as the target storage medium.

5. A recording apparatus comprising:

a storage medium housing for housing a plurality of storage media;

a drive for recording data, including at least video data, on a target storage medium selected from the storage media housed in the storage medium housing;

an individual information manager for managing individual information of the respective storage media housed in the storage medium housing, the individual information including residual area information indicative of the size of a residual area on which data is recordable;

a controller for calculating the size of a residual area required for recording the data and selecting the target storage medium from the storage media housed in the storage medium housing by reference to the size calculated and the individual information of the respective storage media; and an input section for receiving an identifier of the target storage medium, wherein the individual information manager manages identifier information, indicative of an identifier recorded on each said storage medium housed in the storage medium housing, as a piece of the individual information for each said storage medium, wherein if the controller has received the identifier of the target storage medium via the input section, then the controller selects one of the storage media having the received identifier as a qualified candidate of the target storage medium by reference to the identifier information included in the individual information, wherein the individual information manager manages data recording date information, indicative of date and time when data was recorded on each said storage medium housed in the storage medium housing, as a piece of the individual information, and wherein if some of the storage media have the received identifier in common, then the controller selects the target storage medium from these storage media based on the respective data recording date information included in the individual information.

6. The apparatus of claim 5, wherein the controller selects one of the storage media, on which data was recorded at the earliest or latest time judging from the data recording date information thereof, as the target storage medium.

7. A method for recording data, including at least video data, on a target storage medium selected from a plurality of storage media housed in a storage medium housing included in a recording apparatus, the method comprising the steps of:

managing individual information of each said storage medium housed, the individual information including residual area information indicative of the size of a residual area on which data is recordable;

calculating the size of a residual area required for recording the data thereon;

selecting the target storage medium from the housed storage media by reference to the size calculated and the individual information;

recording the data on the target storage medium;

managing identifier information; indicative of an identifier recorded on each said storage medium, as a piece of the individual information for each said storage medium; and receiving an instruction to specify an identifier of the target storage medium from the outside of the recording apparatus during recording the data, wherein the target selecting step includes the steps of:

selecting one of the storage media having the specified identifier as a qualified candidate of the target storage medium by reference to the identifier information included in the individual information;

selecting a storage medium, on which none of the identifiers is recorded, as the target storage medium if it has been determined by reference to the identifier information included in the individual information that no storage medium having the specified identifier is housed; and recording the specified identifier on the selected storage medium.

8. A method for recording data, including at least video data, on a target storage medium selected from a plurality of storage media housed in a storage medium housing included in a recording apparatus, the method comprising the steps of:

managing individual information of each said storage medium housed, the individual information including residual area information indicative of the size of a residual area on which data is recordable;

calculating the size of a residual area required for recording the data thereon;

selecting the target storage medium from, the housed storage media by reference to the size calculated and the individual information;

recording the data on the target storage medium;

managing identifier information, indicative of an identifier recorded on each said storage medium, as a piece of the individual information for each said storage medium; and receiving an instruction to specify an identifier of the target storage medium from the outside of the recording apparatus during recording the data, wherein the target selecting step includes the steps of:
selecting one of the storage media having the specified identifier as a qualified candidate of the target storage medium by reference to the identifier information included in the individual information;

selecting a storage medium, on which none of the identifiers is recorded, as the target storage medium if it has been determined by reference to the identifier information and the residual area information included in the individual information that no storage medium, having not only the specified identifier but also a residual area large enough to store the data, is housed; and recording the specified identifier on the selected storage medium.

9. A method for recording data, including at least video data, on a target storage medium selected from a plurality of storage media housed in a storage medium housing included in a recording apparatus, the method comprising the steps of:

managing individual information of each said storage medium housed, the individual information including residual area information indicative of the size of a residual area on which data is recordable;

calculating the size of a residual area required for recording the data thereon;

selecting the target storage medium from the housed storage media by reference to the size calculated and the individual information;

recording the data on the target storage medium;

managing identifier information, indicative of an identifier recorded on each said storage medium, as a piece of the individual information for each said storage medium;

receiving an instruction to specify an identifier of the target storage medium from the outside of the recording apparatus during recording the data, and managing identifier recording date information, indicative of date and time when an identifier was recorded on each said storage medium, as a piece of the individual information, wherein the target selecting step includes the steps of:
selecting one of the storage media having the specified identifier as a qualified candidate of the target storage medium by reference to the identifier information included in the individual information; and if some of the storage media have the specified identifier in common, selecting the target storage medium from these storage media based on the respective identifier recording date information included in the individual information.

10. A method for recording data, including at least video data, on a target storage medium selected from a plurality of storage media housed in a storage medium housing included in a recording apparatus, the method comprising the steps of:

managing individual information of each said storage medium housed, the individual information including residual area information indicative of the size of a residual area on which data is recordable;

calculating the size of a residual area required for recording the data thereon;

selecting the target storage medium from the housed storage media by reference to the size calculated and the individual information;

recording the data on the target storage medium;

managing identifier information, indicative of an identifier recorded on each said storage medium, as a piece of the individual information for each said storage medium;

receiving an instruction to specify an identifier of the target storage medium from the outside of the recording apparatus during recording the data, and managing data recording date information, indicative of date and time when data was recorded on each said storage medium, as a piece of the individual information, wherein the target selecting step includes the steps of:
selecting one, of the storage media having the specified identifier as a qualified candidate of the target storage medium by reference to the identifier information included in the individual information; and if some of the storage media have the specified identifier in common, selecting the target storage medium from these storage media by reference to the respective data recording date information included in the individual information.

* * * * *